United States Patent
Rael

(10) Patent No.: US 9,388,078 B2
(45) Date of Patent: Jul. 12, 2016

(54) 3D PRINTING POWDER COMPOSITIONS AND METHODS OF USE

(71) Applicant: THE REGENTS OF THE UNIVERSITY OF CALIFORNIA, Oakland, CA (US)

(72) Inventor: Ronald Rael, Oakland, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 209 days.

(21) Appl. No.: 14/198,180

(22) Filed: Mar. 5, 2014

(65) Prior Publication Data

US 2014/0252672 A1    Sep. 11, 2014

Related U.S. Application Data

(63) Continuation of application No. PCT/US2012/056396, filed on Sep. 20, 2012.

(60) Provisional application No. 61/536,766, filed on Sep. 20, 2011.

(51) Int. Cl.
| | |
|---|---|
| *B28B 1/00* | (2006.01) |
| *B29C 67/00* | (2006.01) |
| *C04B 24/38* | (2006.01) |
| *C04B 14/00* | (2006.01) |
| *C04B 24/26* | (2006.01) |
| *C04B 24/30* | (2006.01) |

(52) U.S. Cl.
CPC ............. *C04B 24/383* (2013.01); *B28B 1/001* (2013.01); *B29C 67/0081* (2013.01); *C04B 14/005* (2013.01); *C04B 24/2623* (2013.01); *C04B 24/307* (2013.01); *C04B 24/38* (2013.01)

(58) Field of Classification Search
None
See application file for complete search history.

(56) References Cited

U.S. PATENT DOCUMENTS

| | | |
|---|---|---|
| 2004/0138336 A1 | 7/2004 | Bredt et al. |
| 2005/0003189 A1 | 1/2005 | Bredt et al. |
| 2005/0059757 A1 | 3/2005 | Bredt et al. |
| 2011/0156301 A1 | 6/2011 | Giller et al. |

FOREIGN PATENT DOCUMENTS

WO    9828124 A2    7/1998

OTHER PUBLICATIONS

Korean Intellectual Property Office, International Search Report and Written Opinion, issued on Feb. 14, 2013 for corresponding international patent application No. PCT/US2012/056396 (pp. 1-15) with claims searched (pp. 16-19) pp. 1-19.

Emerging Objects, "Materials" webpage posted Sep. 27, 2013, http://www.emergingobjects.com/category/materials/, pp. 1-4.

*Primary Examiner* — Mary F Theisen
(74) *Attorney, Agent, or Firm* — O'Banion & Ritchey LLP; John P. O'Babion

(57) ABSTRACT

Powder compositions that can be used with traditional 3D printing technology and methods for producing 3D printed building materials that have comparable compressive strength to standard concrete and tensile strength up to 70% greater than standard concrete.

20 Claims, 1 Drawing Sheet

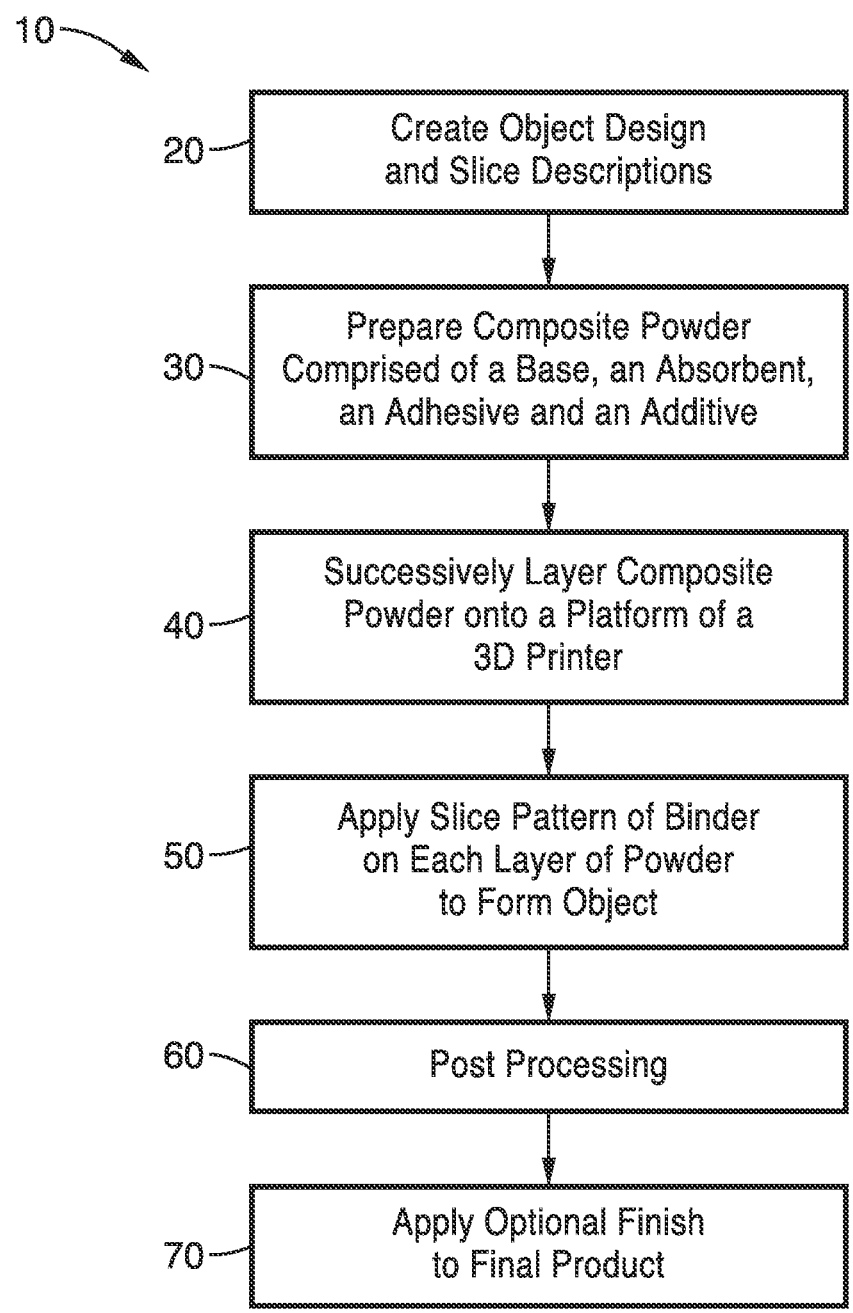

US 9,388,078 B2

3D PRINTING POWDER COMPOSITIONS AND METHODS OF USE

CROSS-REFERENCE TO RELATED APPLICATIONS

This application is a 35 U.S.C. §111(a) continuation of PCT international application number PCT/US2012/056396 filed on Sep. 20, 2012, incorporated herein by reference in its entirety, which claims the benefit of U.S. provisional patent application Ser. No. 61/536,766 filed on Sep. 20, 2011, incorporated herein by reference in its entirety. Priority is claimed to each of the foregoing applications.

The above-referenced PCT international application was published as PCT International Publication No. WO 2103/043908 on Mar. 28, 2013, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL IN COMPUTER PROGRAM APPENDIX

Not Applicable

BACKGROUND OF THE INVENTION

1. Field of the Invention

This invention pertains generally to 3D printing, and more particularly to producing building materials for the construction industry.

2. Description of Related Art

Stereolithography and other rapid prototyping technologies are often used instead of conventional milling processes to prototype components, mechanical devices and tooling. Rapid prototyping processes are beginning to be used in industry to reduce the time and cost that is involved in creating models, mechanical devices, housings, prototypes or to produce small runs of finished products.

One rapid prototyping technology is additive layer manufacturing (ALM) that is also referred to as 3D printing. Unlike milling that removes material to produce an object, ALM builds a solid object from a series of layers of material with each layer printed and formed on top of the previous layer.

The ALM process begins with a computer aided design of an object and software that records a series of digital slices of the entire object. The pattern of each slice of the designed object is sent to the 3D printer to define the respective layers for construction by the printer. A thin layer of powder is spread out on a tray and the pattern of the first slice is applied to the layer of powder. ALM techniques generally use one of two different printing approaches: 1) laser or electron beams that cure or sinter material in each layer or 2) ejection of binder material from a nozzle head to create a patterned layer. The powder materials are fused together at the locations the laser or ejected material comes in contact with the surface of the powder.

Depending on the process that is used, many different types of materials can be used to form the patterned layers of the final product including, photopolymers, thermopolymers, plastics and metal powders.

Several commercial 3D-printing systems are currently available that accurately deposit a liquid binder onto the surface of the powder bed using a multiple array ink-jet printing head. These systems are based upon the work of Emanuel Sach at the Massachusetts Institute of Technology in the early 1990's.

Traditional 3D-printing technology is reserved for small-scale prototyping in a limited number of fields at a significant cost. Rapid prototyping machines generally produce objects that are not suitable as building materials or architectural parts because they have poor structural characteristics and durability. Accordingly, there is a need for powder compositions and methods for 3D-printing of architectural elements and construction materials that are strong, durable and easily configurable.

BRIEF SUMMARY OF THE INVENTION

The present invention generally pertains to 3D powder compositions and methods of fabrication of structural materials using commercial rapid prototyping machines. More particularly, an aspect of the present invention is to use traditional three-dimensional (3D) printing technology to produce building materials that has compressive strength equal to standard concrete and tensile strength up to 70% greater than standard concrete.

The present invention allows conventional 3D printing technology to be used for fabricating structural building materials at low cost and for wide ranges and scales of applications. The cost to manufacture building materials according to the invention is still a fraction of the typical cost of prototyping, even with the inclusion of reinforcement materials and post processing steps in the methods. The output product can be immediately employed in full scale construction. Initial tests demonstrated that the products using the inventive 3D printing powder cement compositions are comparable in strength to standard concrete in compression and up to 70% stronger than standard concrete in tensile strength.

The present invention also introduces a new level of control over how modular building blocks or cladding systems can be considered and derived. The methods of the invention offer high degrees of variability and specificity, and can produce building components that are structurally strong, water resistant and inexpensive to manufacture. The cost of production can be up to 90% less expensive than standard rapid prototyping processes, and the resulting products share similar strengths to concrete with thin-shell capabilities not unlike fiberglass. The invention has the potential to redefine the use of rapid prototyping and, when related to architecture, the degree to which buildings can be responsive and unique to their climate, client and context. All design and design-related fields that employ rapid prototyping may find this invention useful. The powder material compositions can be equal in performance to typical rapid prototyping powders but much less expensive. Because the resulting material can have structural characteristics equal to concrete, it can be considered in the construction industry for the fabrication of specialized building components or formwork.

Accordingly, an aspect of the invention is to provide a rapid prototyping powder material for the 3D printer that produces parts that require strength and durability.

Another aspect of the invention is to decrease the cost of commercially available rapid prototyping powders.

Still another aspect of the invention is to provide a method for producing a printed object that possesses structural characteristics that are similar to concrete and fine structural features.

Further aspects of the invention will be brought out in the following portions of the specification, wherein the detailed description is for the purpose of fully disclosing preferred embodiments of the invention without placing limitations thereon.

BRIEF DESCRIPTION OF THE DRAWING

The invention will be more fully understood by reference to the following drawing which is for illustrative purposes only:

FIG. 1 is a schematic functional flow diagram showing an embodiment of a method for 3D printing producing a cementitious product according to the invention.

DETAILED DESCRIPTION OF THE INVENTION

Referring more specifically to the drawing, for illustrative purposes the present invention is embodied in the compositions and methods generally illustrated in FIG. 1. It will be appreciated that the methods may vary as to the specific steps and sequence and the specific powders, binders and post processing infiltrants may vary as to composition without departing from the basic concepts as disclosed herein. The method steps are merely exemplary of the order that these steps may occur. The steps may occur in any order that is desired, such that it still performs the goals of the claimed invention.

Referring now to FIG. 1, one embodiment of a method 10 for producing 3D printed objects suitable for use as building materials is schematically shown. At block 20 of FIG. 1, a computer model of a selected object in three dimensions is produced by a suitable computer modeling program known in the art. The final computer design of the object is completely sectioned into a series of horizontal digital slices to define a set of slice patterns for each layer. The dimensions of the structure the object are selected by the user and limited only by the size and capabilities of the 3D printer.

At block 30, the powder composites are prepared for use in the conventional 3D apparatus. The individual materials that are used to create the composition, and the composition itself, should be in powder form that is suitable for use in the 3D printer. Preferably, particle size should not exceed approximately 0.5 mm in diameter for this purpose for most 3D printers.

The powder blend that is produced at block 30 according to this embodiment of the invention preferably has four components: (a) an adhesive material; (b) an optional absorbent or hydrator material; (c) a base material and (d) an optional additive that improves the strength of the final object.

In various embodiments, the adhesive component (a) may be selected from the group of materials consisting of: powdered sugar, poly-vinyl alcohol (pva) adhesive, polyureic formaldehyde adhesive, wheat paste, methyl cellulose, powdered wood glue and water putty. Combinations of adhesives may also be used in some embodiments.

In various embodiments, the absorbent or hydrator (b) is selected from the group of maltodextrin, a deflocculant or sodium silicate. Deflocculants can include inorganic flocculants such as alkaline polyphosphates or sodium and potassium carbonates and oxalates as well as organic deflocculants such as polycarbonates, gum arabic and alkaline lignosulfonates.

In various embodiments, the base component (c) may be selected from the group of materials consisting of: expansion cement, mixtures of calcium sulfate and Portland cement e.g. Rockite®, plaster of paris, fly-ash, patching cement, blends of calcium sulfoaluminate cements and specialty sand e.g. Cement-All™, rapid setting cements, mixtures of silica, Portland cement, calcium carbonate, ethylenevinylacetate copolymer and fiberglass e.g. Versabond®, polymer-modified thin set mortars e.g. Flexbond®, portland cement, metal casting plasters e.g. Hydroperm®, gypsum cements e.g. Hydrocal®, type III cement, hydraulic cement, combinations of portland cement, fine sand, silica fume, high-range water-reducing admixture (HRWR), and steel fibers e.g. Ductal®, mixtures of plaster of paris, Portland cement and silica e.g. Hydrostone® and other cement-based materials.

In various embodiments, an optional reinforcing component may be included as an additive material (d). In one embodiment, the optional reinforcing component may comprise an additive material that responds to a binder material. In one embodiment, the additive material may comprise fiber mesh concrete reinforcement fibers and the binder material may comprise rice wine (e.g., sake) that semi-hydrates the fibers.

In various embodiments, the additive material (d) may be selected from the group of materials consisting of fiber mesh, fly-ash, flow control, poly vinyl alcohol (pva) fiber, carbon fiber (i.e. standard tensile modulus), carbon fiber I (i.e. intermediate tensile modulus), carbon fiber II (i.e. intermediate tensile modulus), and an aggregate.

In various embodiments, the composition can comprise 0.75 parts to 2.0 parts (±10%) by weight of adhesive material, zero parts to 2.0 parts (±10%) absorbent material, and 4.0 to 6.0 parts (±10%) base material. Note that in some embodiments absorbent material may be omitted. In various embodiments, the adhesive material and absorbent materials can comprise approximately (i.e. ±10%) 1.25 parts to approximately 4.0 to 6.0 parts of base material.

In one embodiment, the composition produced at block 30 of FIG. 1 comprises: (a) approximately 1.25 parts by weight powdered sugar as the adhesive material; (b) approximately 1.25 parts by weight maltodextrin as the absorbent material; and (c) approximately 5 parts by weight expansion cement (combination Portland cement and plaster of paris) as the base material.

In another embodiment, the composition comprises: (a) approximately 1.25 parts by weight powdered sugar as the adhesive material; (b) approximately 1.25 parts by weight maltodextrin as the absorbent material; and (c) approximately 5 parts by weight of Rockite® (98% calcium sulfate 2% Portland cement) as the base material.

In another embodiment, the composition comprises: (a) approximately 1.25 parts by weight powdered sugar as the adhesive material; (b) approximately 1.25 parts by weight maltodextrin as the absorbent material; (c) approximately 5 parts by weight Rockite® (98% calcium sulfate 2% Portland cement) or expansion cement as the base material; and (d) approximately 1 part fiber mesh.

In another embodiment, the composition comprises: (a) approximately 1.25 parts by weight powdered sugar as the adhesive material; (b) approximately 1.25 parts by weight maltodextrin as the absorbent material; (c) approximately 5 parts by weight Rockite® (98% calcium sulfate 2% Portland cement) or expansion cement as the base material; and (d) approximately 1 part PVA fiber.

The particular ratio selected for the powders at block 30 of FIG. 1 depends on several factors, including material type, ambient humidity, print head and binder type. Viability of a particular composition can be tested by using a spray test. A small sample of the powder can be made and flattened using a flat, smooth object, such as a butter knife. Spraying a fine mist of binder over the material to emulate the machine will result in an appropriate test suitable to understand the viability of the composition. If the resultant surface creates a hard crust after drying, the probability is high that the composition will work well.

In one embodiment, where powdered sugar is used as the adhesive material (a), the powdered sugar is sifted so that large clumps are not added to the mix and it is evenly distributed through the mixture. All ingredients can be added together in a large bucket and shaken to be mixed, or the bucket can be placed in a cement mixer and turned until all ingredients are evenly distributed. This can be determined visually when there is an even and homogeneous distribution of color.

At block 40 of FIG. 1, a thin layer of powder is initially placed to a fabrication platform of the 3D printer with a roller, wiper blade or hopper depending on the configuration of the printer. At block 50, a binder is deposited onto the surface of the powder layer of block 40 in the slice pattern defined for that layer preferably using a multiple array ink-jet type printing head. The printer head typically moves across the surface of the thin powder layer along an X-axis much like a printer head moves across paper and deposits the binder at the defined locations. The head indexes in the Y-direction and makes the next pass along the X-axis to deposit the binder at the defined locations on the powder surface. After the binder pattern is applied to the layer according to the slice of the computer model of the three-dimensional part being formed, the platform is lowered along the Z-axis a distance equal to the thickness of the next layer of powder that is to be patterned. A new layer of powder is applied to the top of the previous patterned layer at block 40 once the platform has been lowered. The thickness of each layer of powder that is successively applied at block 40 is approximately equal to the maximum thickness of the powder layer that will react with the binder that is applied at block 50 so that the layers adhere.

This cycle of powder layer deposition, patterned application of binder to the layer and indexing down is repeated layer by layer and slice by slice until all of the slice defined binder patterns have been applied and the object is complete.

In various embodiments, the binder material may be selected from the group of materials consisting of: sake, vodka, water, methyl alcohol, isopropyl alcohol, a humectant e.g. ZCorp 60 binder, and poly vinyl alcohol (pva).

The foregoing described components create a composition suitable as a rapid prototyping powder that can be readily used with a 3D printer to produce structural parts. After the final layer of the object is fused, the platform is raised and the object is removed from the block of un-bound powder. The un-bound powder can then be reused for subsequent processes.

At block 60 of FIG. 1, the green objects are preferably subject to post processing. Post-processing of the parts produced by a 3D printer using this composition can yield parts with greater strength and durability and that have water-proof properties. However, post processing may be optional for some materials.

For example, in one embodiment such post-processing at block 60 may comprise infiltrating the part with a post-processing material such as epoxy resin 7132. Dipping or painting the objects are examples of post-processing techniques, and it has been shown that dipping provides for excellent infiltration into the part using capillary action. Other techniques could be used as well, such as, for example, vacuum infiltrating.

In various embodiments, the post-processing material may be selected from the group of materials consisting of: resin, epoxy resin, epoxy resin 7132, acrylic resin, fast curing silicone rubbers e.g. Dragon Skin®, sprayed on water, hydrating in a fog room, sprayed with alcohol, and fiber reinforced plastic (frp). The nature of the post processing that is performed can be tailored to the type of powder and binder materials that are selected. In a preferred embodiment, post processing is designed to either harden the green formed objects or to infiltrate the object to further strengthen the structure.

The preferred infiltrant is epoxy resin 7132, due to its low cost ($92), high compression (33 MPa or 4,750 psi, and environmental friendliness. Other resins will work as well and may be stronger. In addition, 3D printer manufacturers such as Zcorp, Inc. sell a post processing infiltrant that costs $256 and provides up to 98 MPa in compression (14,220 psi) when applied to their proprietary powders.

In various embodiments, at block 70 of FIG. 1 the post-processed part may optionally be finished with a finish type selected from the group consisting of: resin finish, sand blasted finish, resin dye finish, and integral color finish, all of which is known in the art.

From the discussion above it will be appreciated that the invention can be embodied in various ways, including the following:

1. A method of producing a product using 3D printing, comprising: (a) preparing a powder composition comprising: (i) approximately 0.75 to approximately 2.0 parts by weight of an adhesive material; (ii) approximately zero to approximately 2.0 parts by weight of an absorbent material; and (iii) approximately 4.0 to approximately 6.0 parts by weight of a base material; (b) introducing the composition into a 3D printer and producing a part with successive applications of powder and a binder; and (c) infiltrating the part with a post-processing material selected from the group of materials consisting of: resin, epoxy resin, epoxy resin 7132, acrylic resin, Dragon Skin®, and fiber reinforced plastic (frp).

2. The method as recited in any of the preceding embodiments, further comprising finishing the post-processed part with a finish type selected from the group consisting of a resin finish, a sand blasted finish, a resin dye finish, and an integral color finish.

3. The method as recited in any of the preceding embodiments, wherein the base material is selected from the group of materials consisting of: expansion cement, Rockite®, plaster of paris, fly-ash, patching cement, Cement-All™, rapid setting cements, Versabond®, Flexbond®, portland cement, Hydroperm®, Hydrocal®, type III cement, hydraulic cement, Hydrostone® and Ductal®.

4. The method as recited in any of the preceding embodiments, wherein the adhesive material is selected from the group of materials consisting of: powdered sugar, poly-vinyl alcohol (pva) adhesive, polyureic formaldehyde adhesive, Dap®, wheat paste, methyl cellulose, powdered wood glue and water putty.

5. The method as recited in any of the preceding embodiments, wherein the absorbent material is selected from the group of materials consisting of: maltodextrin, sodium silicate or a deflocculant.

6. The method as recited in any of the preceding embodiments, wherein the powder composition comprises: (a) approximately 1.25 parts by weight powdered sugar; (b) approximately 1.25 parts by weight maltodextrin; and (c) approximately 5 parts by weight expansion cement.

7. The method as recited in any of the preceding embodiments, wherein the binder material is selected from the group of materials consisting of: rice wine, sake, vodka, water, alcohol, isopropyl alcohol, ZCorp 60 binder, and poly vinyl alcohol (pva).

8. A powder composition for 3D printing, comprising: (a) approximately 0.75 to approximately 2.0 parts by weight of an adhesive material; (b) approximately zero to approximately 2.0 parts by weight of an absorbent material; and (c) approximately 4.0 to approximately 6.0 parts by weight of a base material.

9. The composition as recited in any of the preceding embodiments, wherein the adhesive material is selected from the group of materials consisting of: powdered sugar, poly-vinyl alcohol (pva) adhesive, polyureic formaldehyde adhesive, Dap®, wheat paste, methyl cellulose, powdered wood glue and water putty.

10. The composition as recited in any of the preceding embodiments, wherein the absorbent material is selected from the group of materials consisting of maltodextrin, sodium silicate or a deflocculant.

11. The composition as recited in any of the preceding embodiments, wherein the base material is selected from the group of materials consisting of: expansion cement, Rockite®, plaster of paris, fly-ash, patching cement, Cement-All™, rapid setting cements, Versabond®, Flexbond®, portland cement, Hydroperm®, Hydrocal®, type III cement, hydraulic cement, Hydrostone® and Ductal®.

12. The composition as recited in any of the preceding embodiments, comprising: approximately 1.25 parts by weight powdered sugar adhesive; approximately 1.25 parts by weight maltodextrin absorbent; and approximately 5 parts by weight expansion cement base.

13. The composition as recited in any of the preceding embodiments, comprising: approximately 1.25 parts by weight powdered sugar adhesive; approximately 1.25 parts by weight maltodextrin absorbent; and approximately 5 parts by weight Rockite® base.

14. The composition as recited in any of the preceding embodiments, further comprising a reinforcing additive component.

15. The composition as recited in any of the preceding embodiments, wherein the additive component material is selected from the group of materials consisting of: fiber mesh, fiber mesh concrete reinforcement fibers, fly-ash, flow control, poly vinyl alcohol (pva) fiber, carbon fiber, carbon fiber I, carbon fiber II, and an aggregate.

16. A powder composition for 3D printing, comprising: (a) approximately 0.75 to approximately 2.0 parts by weight of an adhesive material; (b) approximately 1.0 part by weight of an reinforcing additive material; and (c) approximately 4.0 to approximately 6.0 parts by weight of a base material.

17. The composition as recited in any of the preceding embodiments, wherein the additive material comprises fiber mesh concrete reinforcement fibers capable of being semi-hydrated by a rice wine binder.

18. The composition as recited in any of the preceding embodiments, wherein the additive material is selected from the group of materials consisting of: fiber mesh, fly-ash, flow control, poly vinyl alcohol (pva) fiber, carbon fiber, carbon fiber I, carbon fiber II, and aggregate.

19. The composition as recited in any of the preceding embodiments, wherein the base material is selected from the group of materials consisting of: expansion cement, Rockite®, plaster of paris, fly-ash, patching cement, Cement-All™, rapid setting cements, Versabond®, Flexbond®, portland cement, Hydroperm®, Hydrocal®, type III cement, hydraulic cement, Hydrostone® and Ductal®.

20. The composition as recited in any of the preceding embodiments, wherein the adhesive material is selected from the group of materials consisting of: powdered sugar, poly-vinyl alcohol (pva) adhesive, polyureic formaldehyde adhesive, Dap®, wheat paste, methyl cellulose, powdered wood glue and water putty.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of producing a product using 3D printing, comprising:
    (a) preparing a powder composition comprising:
        (i) approximately 0.75 to approximately 2.0 parts by weight of an adhesive material;
        (ii) approximately zero to approximately 2.0 parts by weight of an absorbent material; and
        (iii) approximately 4.0 to approximately 6.0 parts by weight of a base material;
    (b) introducing said composition into a 3D printer and producing a part with successive applications of powder and a binder; and
    (c) infiltrating the part with a post-processing material selected from the group of materials consisting of: resin, epoxy resin, epoxy resin 7132, acrylic resin, silicone, and fiber reinforced plastic (frp).

2. The method as recited in claim 1, further comprising finishing the post-processed part with a finish type selected from the group consisting of a resin finish, a sand blasted finish, a resin dye finish, and an integral color finish.

3. The method as recited in claim 1, wherein the base material is selected from the group of materials consisting of: expansion cement, plaster of paris, fly-ash, patching cement, rapid setting cements, portland cement and hydraulic cement.

4. The method as recited in claim 1, wherein the adhesive material is selected from the group of materials consisting of: powdered sugar, poly-vinyl alcohol (pva) adhesive, polyureic formaldehyde adhesive, wheat paste, methyl cellulose, powdered wood glue and water putty.

5. The method as recited in claim 1, wherein the absorbent material is selected from the group of materials consisting of: maltodextrin, sodium silicate or a deflocculant.

6. The method as recited in claim 1, wherein the powder composition comprises:
    (a) approximately 1.25 parts by weight powdered sugar;
    (b) approximately 1.25 parts by weight maltodextrin; and
    (c) approximately 5 parts by weight expansion cement.

7. The method as recited in claim 1, wherein the binder material is selected from the group of materials consisting of: rice wine, sake, vodka, water, alcohol, isopropyl alcohol, a humectant, and poly vinyl alcohol (pva).

8. A powder composition for 3D printing, comprising:
   (a) approximately 0.75 to approximately 2.0 parts by weight of an adhesive material;
   (b) approximately zero to approximately 2.0 parts by weight of an absorbent material; and
   (c) approximately 4.0 to approximately 6.0 parts by weight of a base material.

9. The composition as recited in claim 8, wherein the adhesive material is selected from the group of materials consisting of: powdered sugar, poly-vinyl alcohol (pva) adhesive, polyureic formaldehyde adhesive, wheat paste, methyl cellulose, powdered wood glue and water putty.

10. The composition as recited in claim 8, wherein the absorbent material is selected from the group of materials consisting of: maltodextrin, sodium silicate or a deflocculant.

11. The composition as recited in claim 8, wherein the base material is selected from the group of materials consisting of: expansion cement, plaster of paris, fly-ash, patching cement, Cement-All™, rapid setting cements, portland cement, and hydraulic cement.

12. The composition as recited in claim 8, comprising:
   approximately 1.25 parts by weight powdered sugar adhesive;
   approximately 1.25 parts by weight maltodextrin absorbent; and
   approximately 5 parts by weight expansion cement base.

13. The composition as recited in claim 8, comprising:
   approximately 1.25 parts by weight powdered sugar adhesive;
   approximately 1.25 parts by weight maltodextrin absorbent; and
   approximately 5 parts by weight of a 98% calcium sulfate 2% Portland cement base.

14. The composition as recited in claim 8, further comprising:
   a reinforcing additive component.

15. The composition as recited in claim 14, wherein the additive component material is selected from the group of materials consisting of: fiber mesh, fiber mesh concrete reinforcement fibers, fly-ash, poly vinyl alcohol (pva) fiber, a standard tensile modulus carbon fiber, a intermediate tensile modulus carbon fiber, a high tensile modulus carbon fiber, and an aggregate.

16. A powder composition for 3D printing, comprising:
   (a) approximately 0.75 to approximately 2.0 parts by weight of an adhesive material;
   (b) approximately 1.0 part by weight of an reinforcing additive material; and
   (c) approximately 4.0 to approximately 6.0 parts by weight of a base material.

17. The composition as recited in claim 16, wherein the additive material comprises fiber mesh concrete reinforcement fibers capable of being semi-hydrated by a rice wine binder.

18. The composition as recited in claim 16, wherein the additive material is selected from the group of materials consisting of: fiber mesh, fly-ash, flow control, poly vinyl alcohol (pva) fiber, a standard tensile modulus carbon fiber, a intermediate tensile modulus carbon fiber, a high tensile modulus carbon fiber, and an aggregate.

19. The composition as recited in claim 16, wherein the base material is selected from the group of materials consisting of: expansion cement, plaster of paris, fly-ash, patching cement, rapid setting cements, portland cement, and hydraulic cement.

20. The composition as recited in claim 16, wherein the adhesive material is selected from the group of materials consisting of: powdered sugar, poly-vinyl alcohol (pva) adhesive, polyureic formaldehyde adhesive, wheat paste, methyl cellulose, powdered wood glue and water putty.

* * * * *